Patent 2,860,163

PRODUCTION OF ASPARAGINE

Harold L. Fike, Chicago, Ill., assignor to International Minerals & Chemical Corporation, a corporation of New York No Drawing. Application December 29, 1955
Serial No. 556,063

4 Claims. (Cl. 260—527)

This invention is concerned with the production of asparagine and more particularly, with the recovery of asparagine from natural sources.

Asparagine, which is widely distributed in nature, is the beta amide of aspartic acid and is one of the oldest known nitrogenous constituents of plants. Conversion of amino acids to protein and asparagine is a critical process in plant growth. Asparagine has been identified in plant cells, alfalfa, tobacco, range grass seeds and the like and numerous attempts have been made to recover it from these natural sources. According to one procedure, asparagine and related amines and acids are leached from a source material with an aqueous alcohol mixture, the resulting solution clarified with lead, and amides present precipitated with mercuric nitrate. Liberation of the amides from the mercuric salts is then effected with hydrogen sulfide to produce small yields of glutamine, asparagine and the like. Such a process is not of commercial significance because it is cumbersome and utilizes reagents which are expensive and which would be toxic if present in the finished product even in trace amounts. There has been a need for a commercially feasible process for obtaining relatively large yields of asparagine from natural sources, particularly from sources which are readily available at low cost.

It is an object of this invention to provide a process for recovering asparagine from raw materials containing asparagine.

It is another object of this invention to provide a process for obtaining asparagine from raw materials in high yields and at low cost.

A further object of this invention is to provide a process for obtaining asparagine in relatively high yields from potato starch waste water.

In accordance with this invention, a raw material containing asparagine is treated with water until the asparagine in the raw material is substantially dissolved. The resulting aqueous solution of asparagine which may contain a considerable quantity of impurities, for example, glutamine and other amino acids, is then treated to recover substantially pure asparagine crystals therefrom. Generally speaking, this procedure involves concentrating the solution until it is supersaturated with respect to asparagine, cooling the supersaturated solution to a temperature between about 30° C. and the freezing temperature of the solution and crystallizing and recovering asparagine from the cooled solution.

In accordance with a preferred embodiment of the invention, potato starch waste water which normally has a solids concentration of about 1% to 2% is concentrated to a solids concentration of between about 15% and about 30%. Potato starch waste water with which this invention is particularly concerned is a by-product of the potato starch industry. In the production of potato starch, potatoes are leached with hot water to extract the starch therefrom and the resulting solution then cooled in order to precipitate potato starch. The potato starch mother liquor is called potato starch waste water.

A typical concentrated potato starch waste water recovered during the production of starch from Maine potatoes has the following analysis:

Concentrated Maine potato starch waste water

| | |
|---|---|
| Glutamic acid (hydrolyzed) | 3.57 |
| Glutamic acid (as is) | 0.18 |
| Glutamine | 0.26 |
| 2-oxo-5-pyrrolidine-carboxylic acid | 2.75 |
| Asparagine | 4.00 |
| Glucose | 8.95 |
| Aspartic acid | 1.00 |
| Ash (700°) | 16.0 |
| Ash (450°) | 18.0 |
| Total N | 2.98 |
| $PO_4$ | 5.1 |
| $SO_4$ | 1.3 |
| $Cl-$ | 1.75 |
| $K+$ | 6.25 |
| $Na+$ | 0.5 |

Other amino acids present

| | |
|---|---|
| Threonine | Histidine |
| Glycine | Valine |
| Serine | Leucine |
| Alanine | Isoleucine |
| Tyrosine | Alpha-amino butyric acid |
| Arginine | |

The waste water is purified by treatment with a precipitating agent for organic impurities in the solution, for example, the waste water is treated with tannin or an alkali lignin or the like for at least about 15 minutes. Tannin treatment comprises adding to the potato starch waste water between about 1% and about 5% tannin based on the weight of the waste water, the tannin being in the form of about a 5%–15% aqueous solution. A more or less concentrated solution of tannin may be utilized but a 10% solution is a convenient concentration. Other precipitating agents are utilized in similar amounts.

Following addition of the tannin solution, the mixture is agitated for at least about 15 minutes and preferably for about one-half hour. Agitation can be continued for a longer period of time but no particular advantage is gained thereby. Following agitation, the tannin precipitate containing impurities is removed by any convenient means, for example, by filtration and the filtrate recovered is further treated for the recovery of asparagine.

Treatment of potato starch waste water with tannin solution prior to crystallization of asparagine therefrom permits recovery of substantially higher yields of asparagine besides substantially increasing the filterability characteristics of the material. With potato starch waste water or other source materials which are particularly pure and rich in asparagine content, asparagine may be recovered in relatively high yields without tannin treatment, but the use of tannin invariably permits the recovery of higher yields of asparagine then otherwise possible and in the case of potato starch waste water or other source materials containing a relatively high percentage of impurities, asparagine recoveries are very substantially improved by tannin treatment.

The solution of asparagine remaining following removal of the tannin precipitate is concentrated until supersaturated with respect to asparagine. Usually the solution is concentrated to a solids concentration of between about 40% and about 70% and preferably to a solids concentration of between about 55% and about 70%. The concentrated solution is then cooled, if necessary, to a temperature between about 30° C. and the freezing temperature of the solution and preferably to a temperature between about 10° C. and the freezing temperature of the solution. Best yields of asparagine are obtained when the crystallization of asparagine is carried out at about 0° C. from an asparagine solution having a solids concentration of about 65%. Usually about three days is sufficient for the asparagine to substantially completely crystallize from solution.

Asparagine crystals, along with attendant impurities, may be removed from its mother liquor by filtration or other convenient means. Impurities may be removed from the asparagine by admixing the crystals with water, heating to about 50° C., treating with activated carbon for decolorization purposes and then removing the activated carbon. Usually agitation of the solution for about one-half hour at 50° C. in the presence of about 4% activated carbon is sufficient to remove most of the impurities. The carbon and associated impurities may be removed from the solution by any convenient means, as by filtration. The asparagine solution is then again cooled to about a temperature of less than about 10° C., and asparagine again crystallized from solution. Asparagine crystals thus obtained have a purity of substantially 100% and are obtained in a yield of about 55% based upon the quantity of asparagine in the starting material. By concentrating the asparagine mother liquor and again re-crystallizing at 0° C., a second crop of crystals may be obtained amounting to about 10% of the asparagine in the starting material.

While it is preferable to employ tannin or tannic acid of a very high degree of purity in this invention, any comparable material which precipitates the organic impurities in an asparagine solution, obtained by treatment of a raw material containing asparagine with water, may be used. For example, impure tannic acid or crude tannins, phlobotannins and such compositions as gallo-tannic acid, digallic acid and others also may be employed within the scope of this invention. Tannin extracts are also acceptable, for example, such extracts as may be obtained by comminution of tannin-bearing material, leaching with water and recovering the extracted solids by evaporation. Synthetic tannins, for example, mono and polygalloylglucose, are also useful. Similarly, any substances which will introduce tannins into the asparagine solution under the conditions obtaining is useful in this invention.

Also effective for the precipitation of impurities from a true asparagine solution are "alkali lignins." By the term "alkali lignin" is meant lignin which is recovered from lignin-cellulose compositions, for example, either hard or soft woods, bagasse, corn stalks and similar products by digesting them with dilute solutions of alkali metal or alkaline earth metal hydroxides, oxides, carbonates or bicarbonates, for example, dilute aqueous sodium or potassium hydroxide. Such solutions extract the lignin from lignin-cellulose compositions thereby forming alkali metal compounds of lignin which are water soluble. Lignin may be recovered from such alkaline solutions by adding thereto suitable acidic reagents such as mineral acids, for example, sulfuric or hydrochloric acid or organic acids such as acetic or formic acid. The term "alkali lignin" as employed in the specification and claims includes lignin products in their substantially neutral form or in the form of alkali metal salts or alkaline earth metal salts, for example, sodium, potassium, calcium and magnesium salts of alkali-extracted lignins. The term "alkali-lignin" does not include lignin which may be produced by the so-called sulfate or kraft process, wherein lignin-cellulose materials are extracted from alkaline solutions containing various sulfate-containing compounds. Such extracts are known in the trade as sulfate and sulfite lignins and are not suitable in the instant process.

Crystallization of asparagine from solution is advantageously carried out at pH values between about 5 and about 7 and preferably at a pH of about 5.5 to about 6.5. Normally, solutions of asparagine obtained by leaching asparagine-containing materials have a pH between about 5 and about 7 and no adjustment is necessary. In the case of asparagine solutions having pH values outside of this range, it is desirable to adjust the pH to between about 5 and about 7 by the addition of an inorganic acid or alkali, as may be required. It has also been found that the treatment of asparagine solutions with tannin or equivalent compounds is also most beneficial if the pH of the solution is between about 5 and about 7. Removal of organic impurities from the solution by the tannin treatment is more efficient within this pH range.

Separation of organic imprities from asparagine solutions by tannin treatment at an appropriate pH is most efficiently conducted at about room temperature, that is, at temperatures between about 20° C. and about 35° C. These temperatures are not critical, however, since impurity removal with tannin at temperatures higher or lower than this range also produces yields of asparagine higher than would be obtained in the absence of a tannin treatment. The time of contact of tannin with the organic impurites contained in an asparagine solution may be varied widely, for example, between about 5 minutes and about 24 hours. Shorter contact times are sufficient when high percentages of tannin are employed, but a contact time between about one-half hour and about 15 hours is usually ample for precipitation of impurities.

Tannin treatment of relatively concentrated asparagine solutions is particularly useful in acceleration of filtration rates, but it is equally efficient for the precipitation of impurities from relatively dilute asparagine solutions. The amount of tannin required is increased in proportion to the quantity of asparagine solution being treated. For the sake of economy, it is desirable that the asparagine solution have a solids concentration between about 20% and about 60% by weight.

The following example illustrates a specific embodiment of this invention. All parts and percentages are by weight unless otherwise indicated.

*Example*

Potato starch waste water having an analysis as indicated above and containing 20% solids by weight was charged into a reaction vessel. The waste water amounted to 500 parts and contained 8 parts asparagine. 10 parts of tannin in the form of a 10% aqueous solution was added to the waste water with vigorous agitation which was continued for one-half hour. The tannin precipitate was then removed by filtration. Crude asparagine was recovered from the tannin filtrate by concentrating the filtrate under reduced pressure to about 150 parts and then cooling to 0° C. and allowing to stand for about three days to permit asparagine to crystallize from solution. Asparagine crystals were separated from the mother liquor by filtration and purified by first slurrying in 50 parts of water and heating to 50° C. Two parts activated carbon was added to the slurry and the mixture agitated for one-half hour at 50° C. Removal of the carbon from the aqueous phase was effected by filtration and the carbon cake was washed with 10 parts water, the washings being combined with the filtrate. The carbon filtrate was cooled to 0° C. and held for 24 hours during which time asparagine crystallized from the solution. Asparagine was separated from its mother liquor by filtration. This first crop of asparagine was obtained in an amount of about 4.2 parts and had a purity of 100%. A second crop of asparagine was obtained by concentrating the asparagine mother liquor and re-crystallizing asparagine therefrom at 0° C. The second crop of asparagine crystals amounted to 1.0 part and had a purity of about 70%. Thus, in two crystallizations, about 60% of the asparagine in the potato starch waste water was recovered, about 80% of that recovery being in the form of 100% pure asparagine.

Having thus fully described and illustrated the character of the instant invention, what is desired to be secured by Letters Patent is:

1. A process for recovering asparagine from potato starch waste water containing nitrogenous and other impurities which comprises initially concentrating said waste water to at least about 15% solids content, admixing with the concentrated solution a precipitating agent selected from the group consisting of the tannins and the alkali lignins, separating the precipitate from the liquid phase, further concentrating the purified concentrated waste water to the point of supersaturation with respect to asparagine when the waste water so concentrated is at a temperature in the range between about 30° C. and the freezing point thereof, and crystallizing asparagine from said concentrated waste water while maintaining the temperature thereof within said range.

2. A process for recovering asparagine from potato starch waste water containing nitrogenous and other organic impurities, which comprises concentrating said waste water to a solids concentration of at least about 15% by weight, commingling with the concentrated waste water a precipitating agent for the organic impurities therein, said precipitating agent being a member of the group consisting of the tannins and the alkali lignins, separating a precipitate containing said impurities from the mixture, concentrating the remaining liquor as required to reach a solids content between about 40 and about 70% by weight and to reach an asparagine concentration above its saturation level at the crystallization temperature thereafter to be employed, cooling the concentrated solution to a temperature below about 30° C. and above its freezing point, and crystallizing and recovering asparagine from the cooled solution.

3. A process as in claim 2 wherein said precipitating agent is an alkali lignin.

4. A process for recovering asparagine from potato starch waste water containing nitrogenous and other organic impurities, which comprises concentrating said waste water to a solids concentration between about 15 and about 30% by weight, commingling a tannin therewith at a pH between about 5 and 7, separating a precipitate containing said impurities from the mixture, concentrating the remaining liquor to a solids content between about 55 and about 70% by weight and to an asparagine concentration above its saturation level at the crystallization temperature thereafter to be employed, cooling the concentrated solution to a temperature below about 10° C. and above its freezing point, and crystallizing and recovering asparagine from the cooled solution.

References Cited in the file of this patent

UNITED STATES PATENTS

| | | |
|---|---|---|
| 2,487,784 | Blish | Nov. 15, 1949 |
| 2,487,785 | Blish | Nov. 15, 1949 |
| 2,487,807 | Hoglan | Nov. 15, 1949 |
| 2,666,080 | Xander | Jan. 12, 1954 |

OTHER REFERENCES

Morton: Lab. Technique in Organic Chemistry, McGraw-Hill Book Co., New York (1938), pp. 147–151.

Vickery et al.: J. Biol. Chem., vol. 145 (1942), pp. 45–53.

Tipson: Technique of Organic Chemistry, vol. III, Interscience Publishers, New York (1950), pp. 378–379, 408.